US008515751B2

(12) United States Patent
Zanolin et al.

(10) Patent No.: US 8,515,751 B2
(45) Date of Patent: Aug. 20, 2013

(54) SELECTIVE FEEDBACK FOR TEXT RECOGNITION SYSTEMS

(71) Applicant: Google Inc., Mountain View, CA (US)

(72) Inventors: Luca Zanolin, London (GB); Marcus A. Foster, West Malling (GB); Richard Z. Cohen, London (GB)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/627,744

(22) Filed: Sep. 26, 2012

(65) Prior Publication Data
US 2013/0080164 A1 Mar. 28, 2013

Related U.S. Application Data

(60) Provisional application No. 61/540,381, filed on Sep. 28, 2011.

(51) Int. Cl.
G10L 15/26 (2006.01)
(52) U.S. Cl.
USPC ............................ 704/235; 704/251; 704/278
(58) Field of Classification Search
USPC .......................... 704/235, 251, 278
See application file for complete search history.

(56) References Cited

U.S. PATENT DOCUMENTS

| 6,253,177 | B1 * | 6/2001 | Lewis et al. | 704/235 |
| 7,660,806 | B2 * | 2/2010 | Brill et al. | 707/999.101 |
| 8,280,733 | B2 * | 10/2012 | Yu et al. | 704/231 |
| 2008/0077406 | A1 * | 3/2008 | Ganong, III | 704/251 |
| 2009/0240488 | A1 | 9/2009 | White et al. | |
| 2010/0104087 | A1 | 4/2010 | Byrd et al. | |

OTHER PUBLICATIONS

Raghavan, Hema, and James Allan. "Proper Names and their Spelling Variations in Automatic Speech recognition output." University of Massachusetts, IR 361 (2005).*
"Levenshtein distance," Wikipedia, accessed online http://en.wikipedia.org/wiki/Levenshtein_distance, Mar. 19, 2013, 3 pages.
International Search Report & Written Opinion, Patent Cooperation Treaty, PCT application No. PCT/US2012/057916, mailed Feb. 15, 2013. 12 pages.
Bohus, D. et al. "*Learning n-best correction models from implicit user feedback in a multi-modal local search application*", Proceedings of the 9th SIGdial Workshop on Discourse and Dialog, Jan. 1, 2008, pp. 21-28.
Hsueh, M. "*Interactive Text Recognition and Translation on a Mobile Device*", Electrical Engineering and Computer Sciences University of California at Berkeley Technical Report No. UCB/EECS-2011-57, May 13, 2011, pp. 1-13.
Shilman, M. et al. "*CueTIP: A Mixed-Initiative Interface for Correcting Handwriting Errors*", The Nineteenth Annual ACM Symposium on User Interface Software and Technology, Oct. 15, 2006; pp. 323-332.

* cited by examiner

Primary Examiner — Vincent P Harper
(74) Attorney, Agent, or Firm — Fish & Richardson P.C.

(57) ABSTRACT

This specification describes technologies relating to recognition of text in various media. In general, one aspect of the subject matter described in this specification can be embodied in methods that include receiving an input signal including data representing one or more words and passing the input signal to a text recognition system that generates a recognized text string based on the input signal. The methods may further include receiving the recognized text string from the text recognition system. The methods may further include presenting the recognized text string to a user and receiving a corrected text string based on input from the user. The methods may further include checking if an edit distance between the corrected text string and the recognized text string is below a threshold. If the edit distance is below the threshold, the corrected text string may be passed to the text recognition system for training purposes.

29 Claims, 13 Drawing Sheets

270

```
public class EditDistanceCalculator {
    private final byte mMaxNewContiguousChars;
    private final byte mMaxNewCharsPerc;
    private short mMaxNewChars;
    private short mCorLength;
    private short mRecLength;
    public EditDistanceCalculator(byte maxNewContiguousChars, byte maxNewCharsPerc) {
        mMaxNewContiguousChars = maxNewContiguousChars;
        mMaxNewCharsPerc = maxNewCharsPerc;
```
280
```
    }
    public EditDistanceCalculator(byte maxNewContiguousChars, byte maxNewCharsPerc) {
        // see Fig. 2E
    }
    public boolean isDistanceAcceptable(CharSequence recText, CharSequence corText) {
        return getDistance(recText, corText) < (mMaxNewCharsPerc * mCorLength / 100);
    }
```
290
```
    private class DeltaTable {
        // see Fig. 2F
    }
```
295
```
    private class Delta {
        // see Fig. 2G
    }
}
```

Fig. 2D

```
public short getDistance(CharSequence recText, CharSequence corText) {
    mCorLength = (short) corText.length();
    mRecLength = (short) recText.length();
    mMaxNewChars = (short) (mMaxNewCharsPerc * mCorLength / 100);
    DeltaTable deltaTable = new DeltaTable(mRecLength + 1, mCorLength + 1);
    for (int corPos = 1; corPos < mCorLength + 1; corPos++) {
        boolean allDead = true;
        for (int recPos = 1; recPos < mRecLength + 1; recPos++) {
            if (recPos - 1 > mCorLength - mMaxNewChars + corPos) {
                deltaTable.mCurrRow[recPos].mDeadEnd = true;
            } else {
                if (recText.charAt(recPos - 1) == corText.charAt(corPos - 1)) {
                    deltaTable.mCurrRow[recPos].copy(deltaTable.mPrevRow[recPos - 1]);
                    deltaTable.mCurrRow[recPos].mContiguousChars = 0;
                } else {
                    Delta deleteDelta = deltaTable.mCurrRow[recPos - 1];
                    deltaTable.mCurrRow[recPos].copy(deleteDelta);
                    Delta insertDelta = deltaTable.mPrevRow[recPos];
                    deltaTable.mCurrRow[recPos].updateIfBetter(insertDelta);
                    Delta substitutionDelta = deltaTable.mPrevRow[recPos - 1];
                    deltaTable.mCurrRow[recPos].updateIfBetter(substitutionDelta);
                }
            }
            if (!deltaTable.mCurrRow[recPos].mDeadEnd) {
                deltaTable.mCurrRow[recPos].updateDeadEnd(corPos, recPos);
            }
            allDead &= deltaTable.mCurrRow[recPos].mDeadEnd;
        }
        if (allDead) {
            return mMaxNewChars;
        }
        deltaTable.nextRow();
    }
    Delta delta = deltaTable.mPrevRow[mRecLength];
    if (delta.mDeadEnd) {
        return mMaxNewChars;
    } else {
        return deltaTable.mPrevRow[mRecLength].mTotalChars;
    }
}
```

```
private class DeltaTable {
    private Delta[] mPrevRow;
    private Delta[] mCurrRow;
    private DeltaTable(int rec, int cor) {
        mPrevRow = new Delta[rec];
        mCurrRow = new Delta[rec];
        for (short i = 0; i < rec; i++) {
            if (i < cor - mMaxNewChars) {
                mPrevRow[i] = new Delta();
                mPrevRow[i].mContiguousChars = 0;
                mPrevRow[i].mTotalChars = 0;
            } else {
                mPrevRow[i] = new Delta();
                mPrevRow[i].mDeadEnd = true;
            }
            mCurrRow[i] = new Delta();
        }
    }
    private void nextRow() {
        Delta[] tempRow = mCurrRow;
        mCurrRow = mPrevRow;
        mPrevRow = tempRow;
        if (mPrevRow[0].mDeadEnd || !mPrevRow[0].canAddContiguousChar()) {
            mCurrRow[0].mDeadEnd = true;
        } else {
            mCurrRow[0] = mPrevRow[0];
            mCurrRow[0].mTotalChars++;
        }
    }
}
```

```
private class Delta {
    byte mContiguousChars;
    short mTotalChars;
    boolean mDeadEnd;
    private void updateDeadEnd(int corPos, int recPos) {
        if (recPos - 1 > mCorLength - mMaxNewChars + corPos + mTotalChars) {
            mDeadEnd = true;
        }
    }
    private void copy(Delta newDelta) {
        mContiguousChars = newDelta.mContiguousChars;
        mTotalChars = newDelta.mTotalChars;
        mDeadEnd = newDelta.mDeadEnd;
    }
    private void updateIfBetter(Delta newDelta) {
        if (newDelta.mDeadEnd) {
            return;
        }
        if (!newDelta.canAddContiguousChar()) {
            // The new delta is a dead end
            return;
        }
        if (mDeadEnd || mTotalChars > newDelta.mTotalChars + 1) {
            mTotalChars = (short) (newDelta.mTotalChars + 1);
            mContiguousChars = (byte) (newDelta.mContiguousChars + 1);
            mDeadEnd = false;
        }
    }
    private boolean canAddContiguousChar() {
        return mTotalChars < mMaxNewChars - 1 && mContiguousChars < mMaxNewContiguousChars - 1;
    }
}
```

Fig. 2G

SELECTIVE FEEDBACK FOR TEXT RECOGNITION SYSTEMS

CROSS-REFERENCE TO RELATED APPLICATION

Priority is hereby claimed to U.S. Provisional Application No. 61/540,381, which was filed on Sep. 28, 2011. The contents of U.S. Provisional Application No. 61/540,381 are hereby incorporated by reference into this disclosure.

TECHNICAL FIELD

The present disclosure relates to the recognition of text in various media.

BACKGROUND

Voice recognition systems capable of detecting audio speech signals and converting them into related text have been deployed to allow users to interact with computers through voice commands. For example, voice recognition systems have been used to automate the answering and processing of customer service calls.

Optical Character Recognition (OCR) systems capable of extracting text from images have been deployed to facilitate copying and searching of text stored in image files. For example, OCR systems have been used to extract text from images stored as portable document files (PDFs).

Text recognition systems (e.g., voice recognition systems or OCR systems) may use machine learning models that are trained using a large set of training data. For example, the training data may include audio voice signals and paired text equivalents or labels. Generating the data set used to train a text recognition system may be expensive.

SUMMARY

This specification describes technologies relating to recognition of text in various media. In general, one aspect of the subject matter described in this specification can be embodied in a method that includes receiving an input signal comprising data that corresponds to one or more words. The method may further include passing the input signal to a text recognition system that generates a recognized text string based on the input signal. The method may further include receiving the recognized text string from the text recognition system. The method may further include presenting the recognized text string to a user. The method may further include receiving a corrected text string based on input from the user. The method may further include checking if an edit distance between the corrected text string and the recognized text string is below a threshold. The method may further include if the edit distance is below the threshold, passing the corrected text string to the text recognition system for training purposes.

In general, one aspect of the subject matter described in this specification can be embodied in a system that includes a data processing apparatus and a memory coupled to the data processing apparatus. The memory having instructions stored thereon which, when executed by the data processing apparatus cause the data processing apparatus to perform operations including receiving an input signal comprising data that corresponds to one or more words. The operations may further include passing the input signal to a text recognition system that generates a recognized text string based on the input signal. The operations may further include receiving the recognized text string from the text recognition system. The operations may further include presenting the recognized text string to a user. The operations may further include receiving a corrected text string based on input from the user. The operations may further include checking if an edit distance between the corrected text string and the recognized text string is below a threshold. The operations may further include, if the edit distance is below the threshold, passing the corrected text string to the text recognition system for training purposes.

In general, one aspect of the subject matter described in this specification can be embodied in a mobile device that includes a microphone configured to receive an input signal comprising data that corresponds to one or more words. The mobile device may further include a wireless network interface configured to transmit the input signal to a text recognition system that generates a recognized text string based on the input signal. The mobile device may further include a wireless network interface configured to receive the recognized text string from the text recognition system. The mobile device may further include a display configured to present the recognized text string to a user. The mobile device may further include a user interface configured to receive one or more edits to the recognized text string from the user. The mobile device may further include a module configured to determine a corrected text string based on the recognized text string and the edits. The mobile device may further include means for checking if an edit distance between the corrected text string and the recognized text string is below a threshold. The mobile device may further include a wireless network interface configured to, if the edit distance is below the threshold, pass the corrected text string to the text recognition system for training purposes.

In general, one aspect of the subject matter described in this specification can be embodied in a system that includes an interface configured to receive an input signal comprising data that corresponds to one or more words. The system may further include an interface configured to pass the input signal to a text recognition system that generates a recognized text string based on the input signal. The system may further include an interface configured to receive the recognized text string from the text recognition system. The system may further include an interface configured to present the recognized text string to a user. The system may further include an interface configured to receiving a corrected text string based on input from the user. The system may further include means for checking if an edit distance between the corrected text string and the recognized text string is below a threshold. The system may further include an interface configured to, if the edit distance is below the threshold, pass the corrected text string to the text recognition system for training purposes.

In general, one aspect of the subject matter described in this specification can be embodied in a computer readable medium storing software including instructions executable by a processing device that upon such execution cause the processing device to perform operations that include receiving an input signal comprising data that corresponds to one or more words. The operations may further include passing the input signal to the text recognition system that generates a recognized text string based on the input signal. The operations may further include receiving the recognized text string from the text recognition system. The operations may further include presenting the recognized text string to a user. The operations may further include receiving a corrected text string based on input from the user. The operations may further include checking if an edit distance between the corrected text string and the recognized text string is below a threshold. The operations may further include, if the edit distance is below the threshold, passing the corrected text string to the text recognition system for training purposes.

These and other embodiments can each optionally include one or more of the following features. The edit distance may represent a Levenshtein distance. The edit distance may represent the minimum number of single character insertion, deletion, or substitution operations required to transform the recognized text string into the corrected text string The edit distance may be a minimum number of write operations, from a set of allowed operations, needed to produce the corrected text string from the recognized text string, wherein write operations include character insertion and character substitution, and wherein character deletion is allowed but not counted in the edit distance. The edit distance may be a maximum number of consecutive characters inserted. The input signal may be an auditory speech signal. The input signal may be an image signal. The text recognition system may be executed by a remotely located server. The text recognition system may be executed by a user device. Passing the input signal to a text recognition system may include transmitting a signal encoding the input signal through a network. Checking if an edit distance between the corrected text string and the recognized text string is below threshold may include determining the edit distance and comparing the edit distance to the threshold. Checking if an edit distance between the corrected text string and the recognized text string is below threshold may include computing intermediate edit distance values until the threshold is exceeded or the edit distance is determined. Receiving a corrected text string based on input from the user may include receiving data that represents one or more user edits to the recognized text string and determining a corrected text string based on the recognized text string and the edits. The units of the edit distance may represent a number of characters. The units of the edit distance may represent a number of phonemes. The units of the edit distance may represent a number of words. The threshold may depend on a length of the corrected text string. The threshold may be approximately fifty percent of the length of the corrected text string. Presenting the recognized text string to a user may include transmitting the recognized text to a user device for display to the user. Presenting the recognized text string to a user may include displaying the recognized text on a display.

Particular embodiments of the invention can be implemented to realize none, one or more of the following advantages. Some implementations may facilitate the training machine learning based text recognition systems. Some implementations may filter out less useful data from a set of training data collected from a user. Along with reducing the cost of text recognition services by providing low cost data for training purposes, some implementations may improve the quality of a text recognition service by providing more reliable data for training purposes. Some implementations may facilitate adaptation of text recognition systems to the characteristics of individual users.

The details of one or more embodiments of the invention are set forth in the accompanying drawings and the description below. Other features, aspects, and advantages of the invention will become apparent from the description, the drawings, and the claims.

BRIEF DESCRIPTION OF THE DRAWINGS

FIGS. 2D-G are a code listing for an example process for checking if an edit distance is below a threshold.

Like reference numbers and designations in the various drawings indicate like elements.

DETAILED DESCRIPTION

Figure 1:
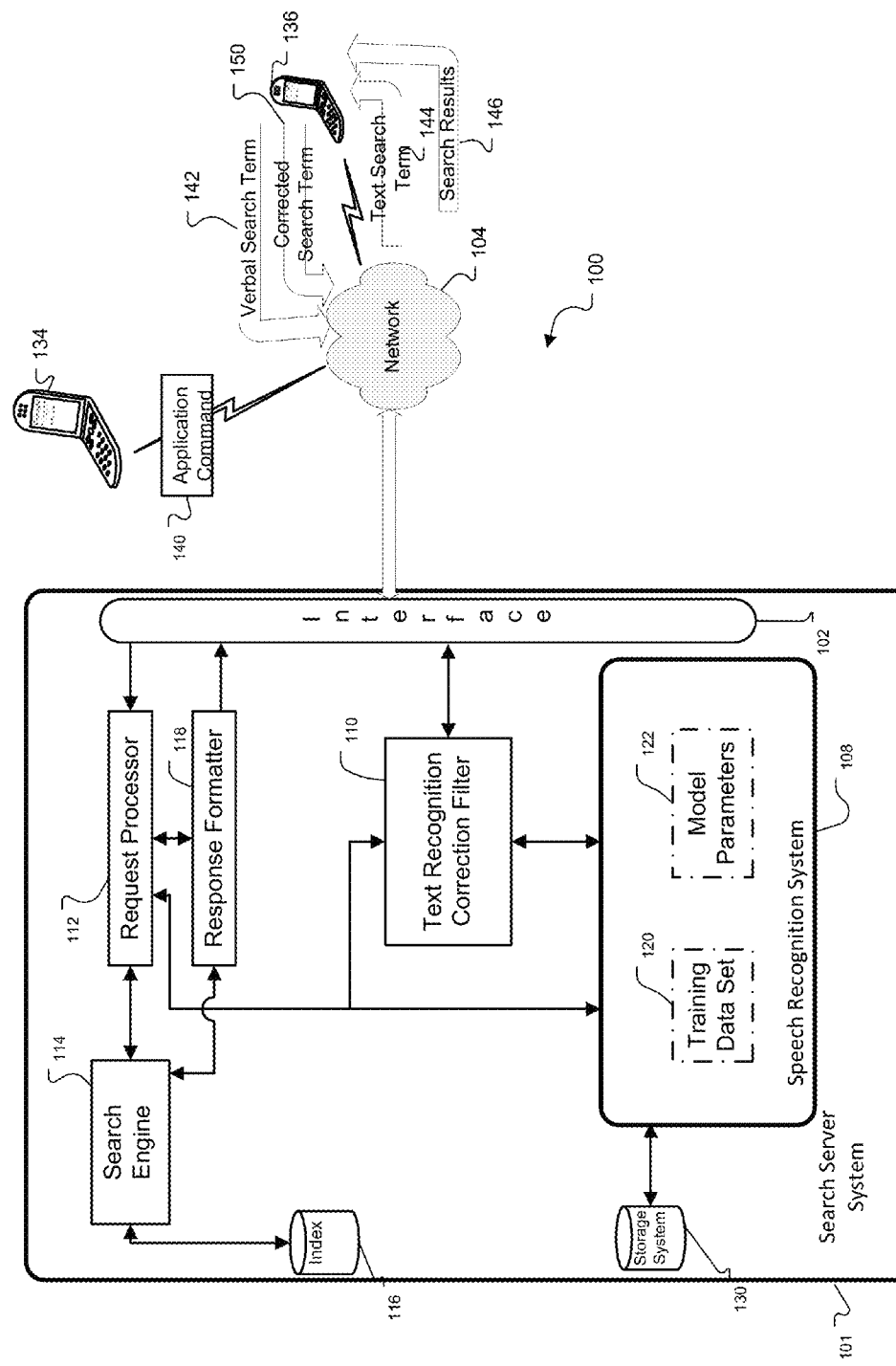
FIG. 1 is a block diagram of an example online environment.

A text recognition system (e.g., a speech recognition system or OCR system) is used to extract text from input signals that reflect information including words or other symbols. A text recognition system may include a machine learning system (e.g., a hidden markov model, a feature based linear regression, an artificial neural network) that trains a model, used to detect text in input signals, by analyzing numerous example input signals that have each been paired with a known text string representing the words or symbols that are reflected in that input signal. A set of input signal and text string pairs used for this purpose may be considered training data. In some implementations, additional training data may be collected from one or more users of a text recognition system and used to further refine a model used by the text recognition system. When many users (e.g., thousands of users) access and utilize a text recognition system through a network, the users may collectively be a vast and cost efficient source of training data.

The accuracy of text recognition systems may be improved by feeding back corrections that a user made to a given recognized text string. For example, a user of a speech recognition service may say "pictures of the Golden Gate Bridge at sunset" as part of verbal search query. The speech recognition service may recognize "pictures of Golden Gate Bridge and sunset". The user could then edit the text returned from the speech recognition service and correct the mistakes made by the service. The resulting corrected text string may then be paired with the input audio speech signal to form an example that may be used by the speech recognition system underling the service as training data.

However, in some cases, the user may make significant changes to the recognition text or even write a completely new text. This circumstance may arise due to, for example, a low signal to noise ratio in the input signal, user error, or a user who is making the edits for a primary purpose other than training the speech recognition system, i.e. inputting what the user intended to say rather than what the user actually said. In such cases it may not be helpful to feed the user's edits back into the speech recognition service for use as training data, since the new text is not necessarily closely related to the originally spoken query anymore.

An edit distance between the recognized text string and a corrected text string that results from a user's edits may be used to measure the significance of user edits. The edit distance between two text strings may measure how many edit operations are required to change one text into another. For example, the Levenshtein distance between the two text strings is the minimum number of single character insertion, deletion, or substitution operations required to transform one text string into the other. Only user corrections with edit distances that are below a pre-defined threshold would typically be taken into account for future text recognition system training and improvements. All other changes may be deemed too significant to be useful. In this manner, edit distance calculation and thresholding may be used to filter corrected text strings collected from users to provide a more reliable set of training data.

FIG. 1 is a block diagram of an example online environment 100 in which a text recognition corrections filter may be utilized to selectively collect training data for a text recognition system. In this example, a speech recognition system 108 is part of a verbal search server system 101 available to users through a network 104. The speech recognition system 108 may include training data 120 that it uses to determine model parameters 122. Model parameters may then be used to identify words occurring in an audio input signal. The set of training data may be large and may be stored in storage system 130.

Users access the verbal search service from their devices 134, 136 (e.g., smart phones, tablet computing devices, computers, etc.). Users may use their devices to interact with the search server system 101 by submitting application commands 140. For example, a user of mobile device 136 may submit a verbal search term 142 to the search server system 101. The verbal search term may include an audio input signal and is received using the interface 102 and passed to the request processor 112. The request processor 112 may then send the audio portion of the received request to the speech recognition system 108, which identifies words in the audio and returns a recognized text string that may be used as a search query. The resulting formatted search query is then passed to the search engine 114, which searches its index 116 and outputs a set of search results to the response formatter 118. The response formatter 118 may generate a responsive webpage or other type of response (e.g., text, imagery, etc.). The responsive webpage may be transmitted by the interface 102 through the network 104 to mobile device 136. The responsive webpage may include a display of the text search term 144 derived from the recognized text string and search results 146. The user of mobile device may then perceive an error in the text search term that resulted from the user's verbal search term.

At this point the user may input corrective edits to the text search term and resubmit the query as a corrected search term 150. The corrected search term 150 may be received, through interface 102, by both the request processor 112 and a text recognition corrections filter 110. The text recognition corrections filter 110 may have previously received the recognized text string that resulted from the verbal search term 142 from the speech recognition system 108. The text recognition corrections filter 110 may use one or more edit distances between the recognized text string that resulted from the verbal search term and the corrected search term to assess the likely value of the corrected search term as training data. The text recognition corrections filter 110 may apply thresholds to the edit distances to determine whether the corrected search term should be used as training data by the speech recognition system 108. Corrected search terms selected in this manner may be passed to the speech recognition system 108, possibly along with the corresponding verbal search term, and stored in the storage device 130 for use in future training to adjust the model parameters 122.

Figure 7:
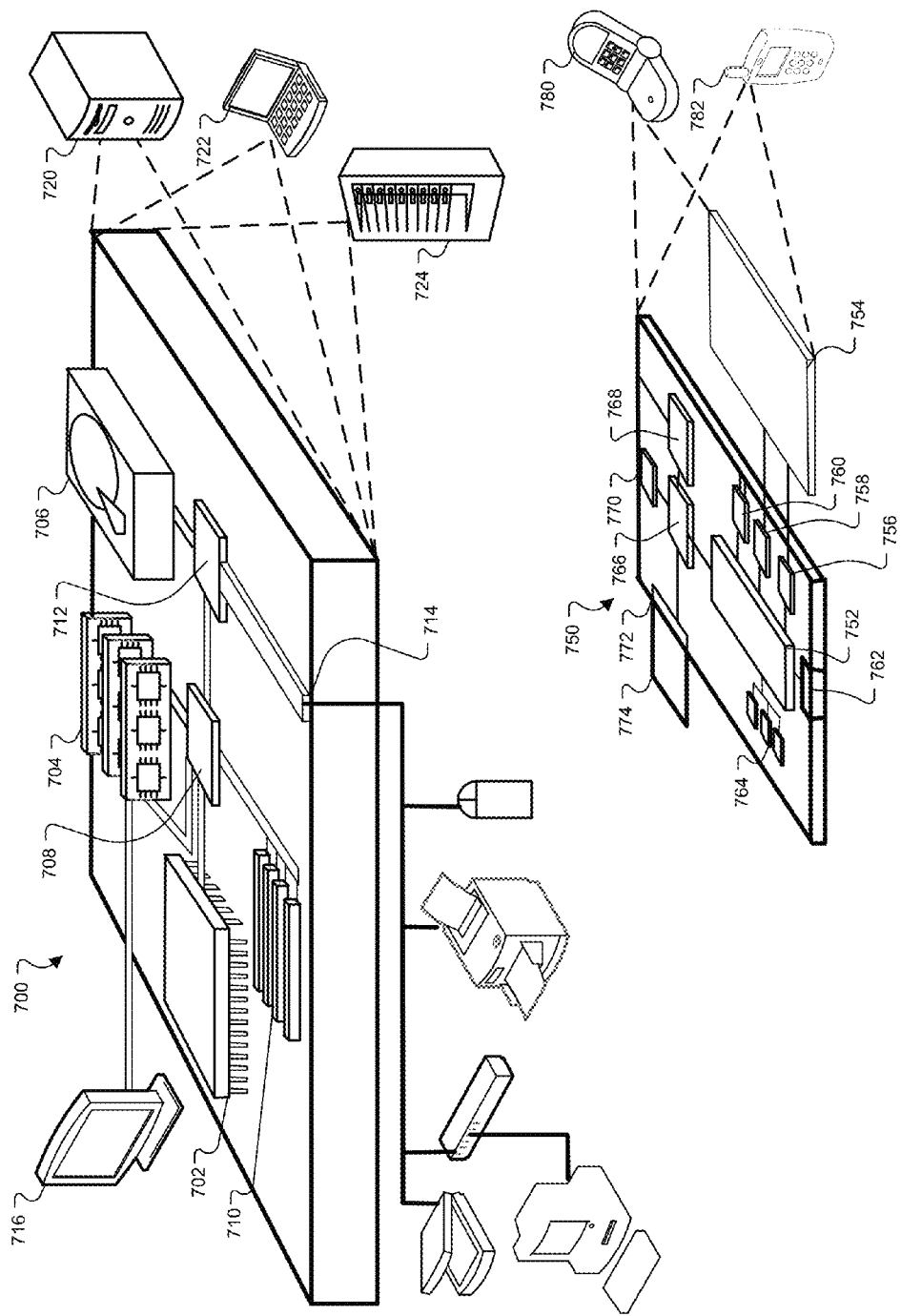
FIG. 7 shows an example of a computer device and a mobile computer device that can be used to implement the techniques described here.

The text recognition corrections filter 110 may be implemented as software, hardware or a combination of software and hardware that is executed on a processing apparatus, such as one or more computing devices (e.g., a computer system as illustrated in FIG. 7).

Figure 2A:
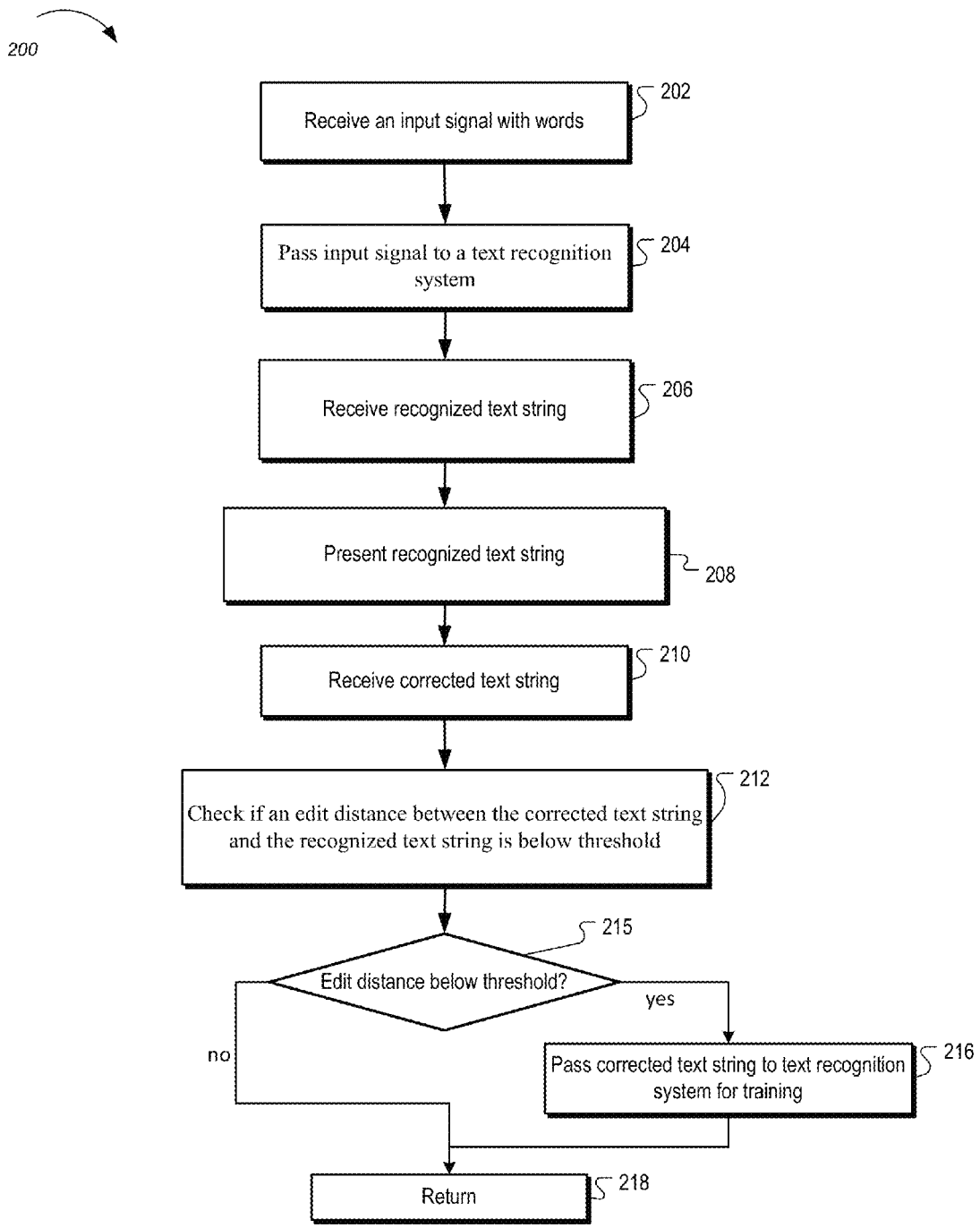
FIG. 2A is a flow chart of an example process for collecting and filtering text recognition training data from users of a text recognition system.

FIG. 2A is a flow chart of an example process 200 for collecting and filtering text recognition system corrections from users of a text recognition system. A user interaction with a text recognition system is facilitated and results in a correction of recognized text string by the user. An edit distance between a recognized text string and the resulting corrected text string is checked to determine if the distance is below a threshold. In this arrangement, corrected text strings with distances above the threshold are filtered out. Corrected text strings with distances below the threshold are passed to the text recognition system for use as training data to further adapt or refine the a text extraction model used by the text recognition system.

The process 200 can be implemented, for example, by the text recognition correction filter 110 in the search server system 101 of FIG. 1. In some implementations, the search server system 101 is a data processing apparatus that includes one or more processors that are configured to perform actions of the process 200. For example, the data processing apparatus may be a computing device (e.g., as illustrated in FIG.7). In some implementations, the process 200 may be implemented by a text recognition correction filter that is executed by a user's mobile computing device (e.g., also illustrated in FIG. 7). For example, process 200 may be implemented by the text recognition correction filter 552 that is executed by the mobile device described in FIGS. 3-6. In some implementations, a computer readable medium can include instructions that when executed by a computing device (e.g., a computer system) cause the device to perform actions of the process 200.

An input signal including information representing one or more words or symbols is received 202. For example, the input signal may be an audio speech signal that is input to a verbal search service. In some implementations, the input signal may be an image file containing a picture of printed words, e.g., a sign or a page from a book. The words or symbols represented in the input signal may be in any language the text recognition system is capable of processing (e.g., English or Chinese).

The input signal may be received 202 from a user device 134, 136 (e.g., a cell phone). The input signal may be received via a server system interface component 102 of the search server system 101. In some implementations, the input signal may be received 202 through a microphone on a user device (e.g. microphone 309). In some implementations, the input signal may be received 202 through a camera on a user device (e.g. camera 307).

The input signal is passed 204 to a text recognition system. In some implementations, the text recognition system runs on a remote server. For example, passing 204 the input signal may be accomplished by transmitting the input signal via a network, using a network interface (e.g., a wireless network interface including an antenna). In some implementations, the text recognition system is integrated with and runs on the same local device as process 200. For example, passing 204 the input signal may be accomplished by storing the input signal in a particular memory location or passing a pointer to input signal into the text recognition system as an argument to an application programmer interface function.

A recognized text string is received 206 from the text recognition server. The text recognition system may identify words or other symbols represented in the input signal and generate a recognized text string that is a text representation of the identified words or symbols. For example, the recognized text string may be a sequence of characters encoded in accordance with a standard character-encoding scheme (e.g., American Standard Code for Information Interchange (ASCII)). The recognized text string may be received 206 in a variety of ways (e.g., from a remote server through a network, by dereferencing a pointer to memory, etc.).

The recognized text string may be presented 208 to a user. The recognized text string may be presented by rendering a visual representation of the recognized text string on the display (e.g., a liquid crystal display) of a user device. For example the recognized text string may be presented on display 301 of FIG. 3. In some implementations, presentation to a user may be accomplished by transmitting the recognized text string to a user device. For example, the text recognition corrections filter 110 may present 208 the recognized text by transmitting the recognized text to a remote user device 136.

A corrected text string based on input from the user may be received 210. The corrected text string may be a sequence of characters encoded in accordance with a standard character-encoding scheme (e.g., ASCII) that reflects user input. For example, a user presented with the recognized string may input edits to the text through a user interface (e.g., a keypad or a touch-screen display). The corrected text string may be determined by interpreting the user's edit commands and applying them to a copy of the recognized text string. For example, a corrected text string may be derived from user edits input through keyboard 302 on the mobile device of FIG. 3. In some implementations, the corrected string is received 210 in a communication signal from a remote device through a network. For example, the text recognition correction filter 110 may receive, through the interface 102, a corrected text string that has been transmitted through a network by a user device.

A check 212 is performed to determine whether an edit distance between the recognized text string and the corrected text string is below a threshold. The edit distance may provide an indication of how similar the two text strings are. In some implementations, an edit distance is determined and then compared to a threshold, e.g., the data flow of FIG. 2B. For some edit distances (e.g., the Levenshtein distance), algorithms for calculating the edit distance exist that have monotonic properties, which may allow a determination of whether or not an edit distance will be below a threshold before the complete edit distance computation has been completed. In some implementations, intermediate values may be computed in an accordance with an edit distance computation algorithm until it is determined that the edit distance must exceed the threshold or until the edit distance is determined, e.g., the program listing of FIG. 2D.

Many possible edit distances may be defined and used to assess the similarity of the strings and thus the likely utility of the corrected text string as training data for a text recognition system. One example is the Levenshtein distance between two portions of text (e.g., word, passage, etc.), which is defined as the minimum number of allowed edit operations required to transform a one of the text portions into the other. For the Levenshtein distance, the allowed edit operations are typically insertion of a single character, deletion of a single character, and substitution of a single character. An example process for determining the Levenshtein distance between the recognized text string and the corrected text string is describe in relation to FIG. 2C.

In some implementations, a modified Levenshtein distance may be used that counts the minimum number of insertions of single character and substitutions of a single character, while disregarding deletions of characters required to transform between the two texts. This modified Levenshtein distance may be a useful edit distance in a text recognition corrections filter, because noisy input signals (e.g., background noise in a speech audio signal) may cause extra characters in the recognized text when underlying words or symbols are not present (e.g., silence periods or pauses in speech). This circumstance may make deletions more common and less informative. A process for checking this edit distance is describe in relation to FIG. 2D.

Another example of an edit distance is the maximum number of consecutive characters inserted to form the corrected text string. The maximum number of consecutive characters inserted is also checked by the process described in relation to FIG. 2D. In some implementations, multiple edit distances may be checked and a corrected text string may be selected for training if all of the edit distances are below their respective thresholds.

Edit distances and their thresholds may be measured in a variety of units. For example, speech recognition systems may return a sequence of coded phonemes or coded words, which in turn may be represented as sequences of characters. The edit distance used may define the set of allowable operations to be on insertion, deletions, or substitutions of single phonemes or of single words.

The threshold may depend on properties of the recognized text string or the corrected text string. For example, the threshold for the edit distance may be set to a percentage (e.g., 50%) of the length of the corrected text string. In some implementations, a different threshold may be used for each distance metric used. For example, a fixed threshold (e.g., 15 characters) may be used for the maximum consecutive characters inserted edit distance. The exact value of the threshold may be determined iteratively and may remain flexible throughout the life of the system. Updates to the threshold, may depend in part on a performance metric differential for a text recognition system before and after training with corrections data collected using the previous value of the threshold.

For example, the edit distance may be checked 212 by the text recognition corrections filter module 110 of the search server system 101. The edit distance may be checked 212 by the text recognition correction filter 552 of the mobile device, illustrated in FIGS. 3-6.

If the edit distance is below the threshold 215, then the corrected text string is selected for use as training data for a text recognition system. In this case, the corrected text string may be passed 216 to the text recognition system for training purposes. As with the input signal, the corrected text string may be passed 216 in a variety of ways (e.g., transmitting, copying to memory, etc.) that may depended on a nature of the system implementing process 200 is and its relationship to the text recognition system. In some implementations, a text recognition system may immediately update its model parameters based on the corrected text string. In some implementations, the text recognition system may store the corrected text string for later use in training In some implementations, selected corrected text strings may be stored locally before being passed to the text recognition system in batches (e.g., periodically or after a certain number of strings have been selected).

If the edit distance is not below the threshold 215, then the corrected text string may be disregarded for training purposes. Process 200 may then terminate 218 or wait for new input signals for a text recognition system before restarting.

Figure 2B:
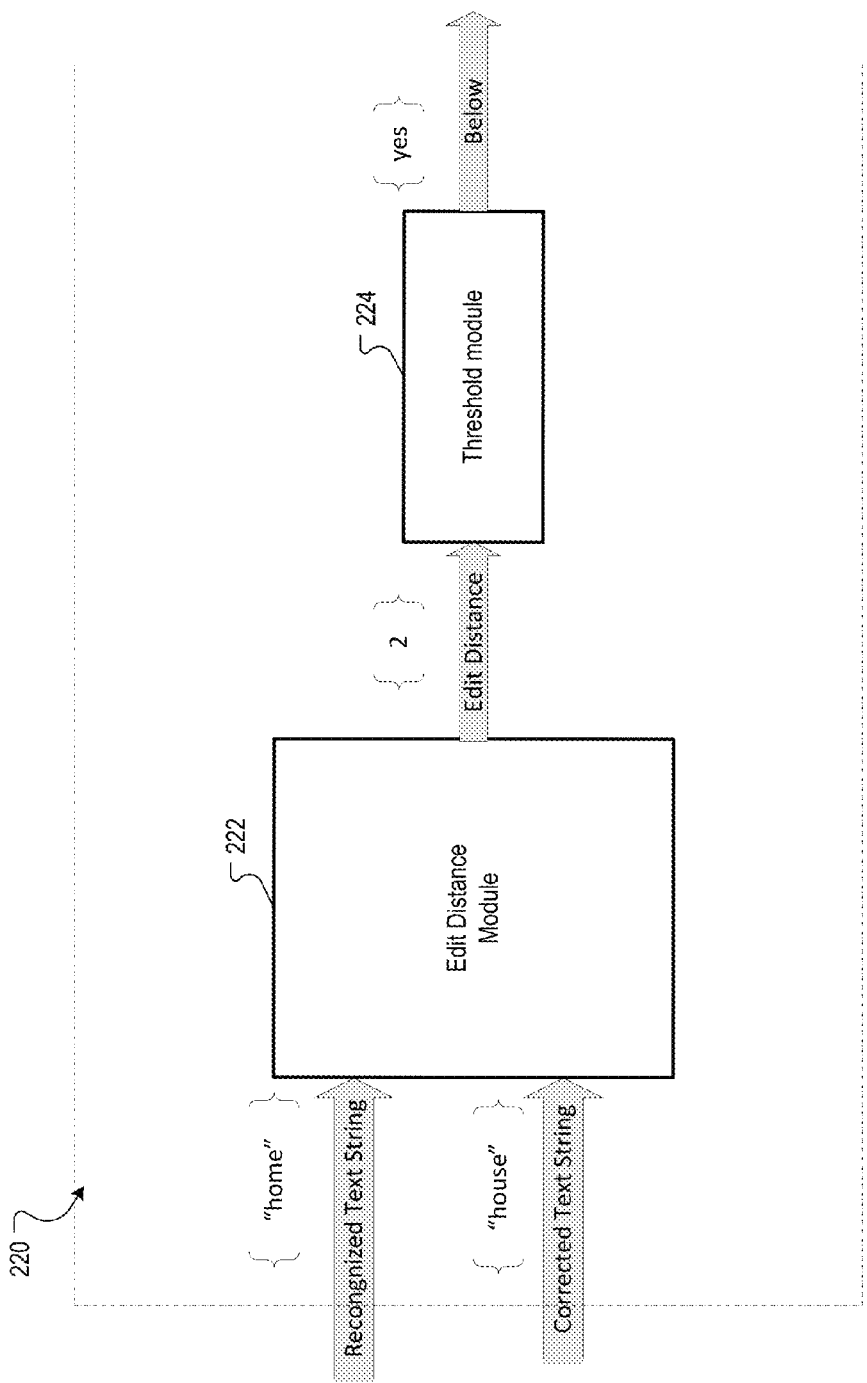
FIG. 2B is a data flow diagram of an example module for checking whether an edit distance between a recognized text string and a corrected text string is below a threshold.

FIG. 2B is a data flow diagram of an example module 220 for checking whether an edit distance between a recognized text string and a corrected text string is below a threshold. The diagram illustrates a check on exemplary data. The module 220 accepts a recognized text string ("Home") and a corresponding corrected text string ("House"). These two text strings are first passed into an edit distance module 222 that determines an edit distance between the two strings. For example, the edit distance module 222 may implement a process 250 (illustrated in FIG. 2C) to determine the Levenshtein distance between the two strings. The Levenshtein distance between Home and House is 2. For example, "home" may be transformed to "house" by inserting a "u" character and substituting an "s" character for the "m" character. There are no transformations that use less than two of the allowed single character edit operations to map from "home" to "house". Thus, the edit distance module 222 outputs an edit distance of 2 and passes the quantity to a threshold module 224 that compares the edit distance to a threshold and outputs a classification of the corrected text. For example the classification may be a binary output (e.g., yes or no, zero or one) indicating whether the edit distance was below the threshold, and by implication whether the corrected text string is likely to be useful for training In this example, the threshold used by the threshold module 224 is 50% of the length of the corrected text string, in this case 2.5. Since the distance is below the threshold, the threshold module outputs a "yes" classification, which in turn is output by module 220.

For example, module 220 may be implemented as part of the text recognition correction filter 110 of the search server system 101. The module 220 may be implemented by the text recognition corrections filter 552 of the mobile device 300.

Figure 2C:
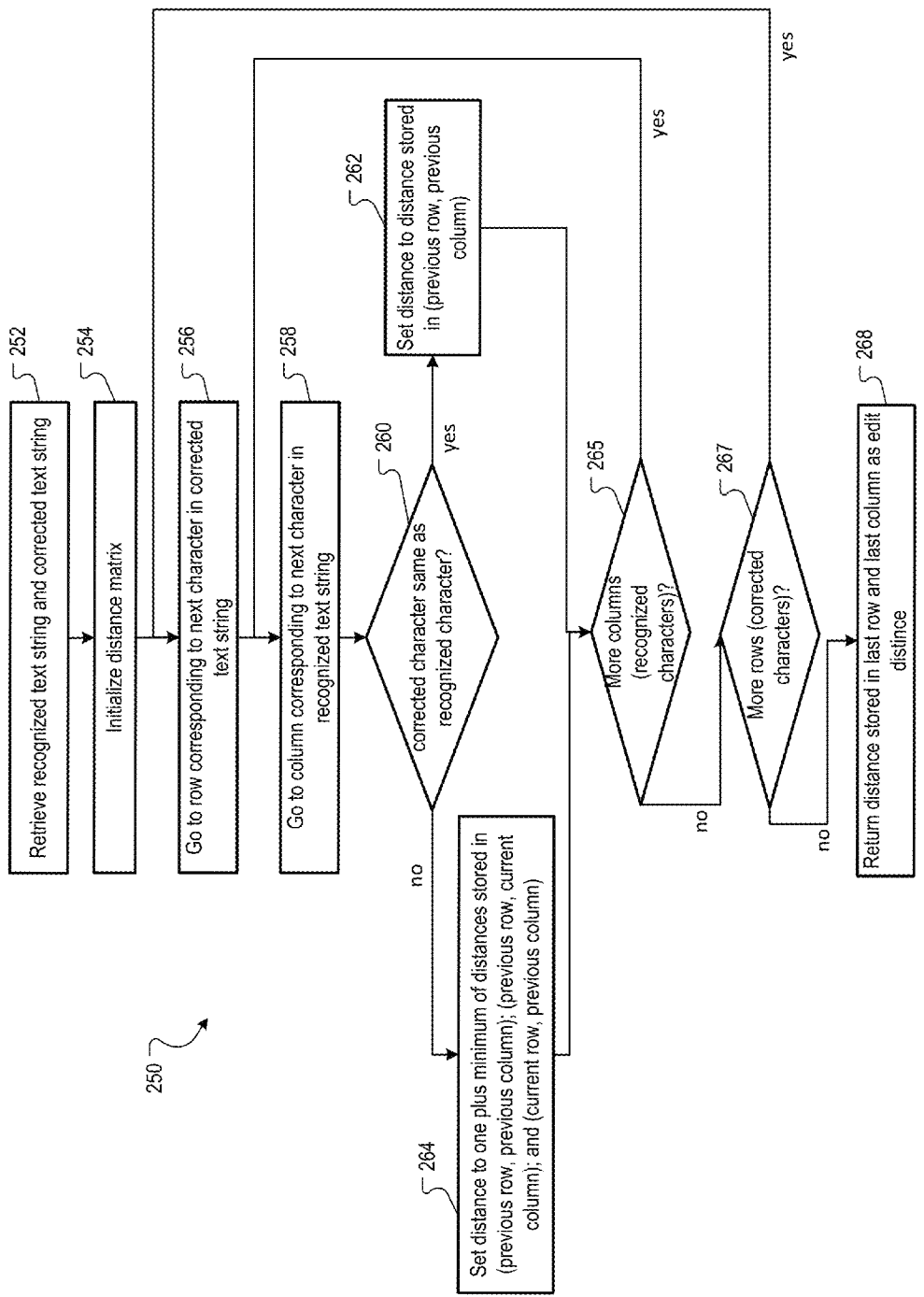
FIG. 2C is a flow chart of an example process for determining an edit distance between a recognized text string and a corrected text string.

FIG. 2C is a flow chart of an example process 250 for determining a Levenshtein distance between a recognized text string and a corrected text string. The process sequentially builds a matrix of distances, i.e. counts of edit operations. The value of each element will be set to the Levenshtein distance between prefixes of the two strings with lengths corresponding to the row and column numbers. The value of the last element of the matrix calculated (last row, last column) is the Levenshtein distance between the complete recognized text string and the complete corrected text string.

For example, process 250 may be implemented by the text recognition correction filter 110 of the search server system 101. The process 250 may be implemented by the text recognition corrections filter 552 of the mobile device 300.

The corrected text string and the recognized text string are retrieved 252 and the distance matrix is initialized 254. The dimension of the distance matrix depends on the lengths of the two text strings and is equal to one plus the length of the corrected text string by one plus the length of the recognized text string. In the example, rows of the matrix correspond to characters of the corrected text string and columns correspond to characters of the recognized text string. The first row and first column of the distance matrix both correspond to null strings, i.e. strings with no characters. The element in the first row and column is set to the distance between two null strings, i.e. zero. The remaining elements in the first row are set to length of the prefix of the recognized text string that ends with the character corresponding to the element's column. Similarly, the remaining elements in the first column are set to length of the prefix of the corrected text string that ends with the character corresponding to the element's row.

After initialization, the element values may be determined based on whether individual characters, corresponding to the row and column, match and the distance values for nearby elements in the matrix, i.e. for prefixes of the same length or one character less. Processing starts in second row 256, second column 258, which corresponds to the first character of the corrected text string and the first character of the recognized text string.

The character of the corrected text string corresponding to the current row is compared 260 to the character of the recognized text string corresponding to the current column. If the two characters are equivalent, then the distance for this element is set 262 to the value stored for the element in the previous row, previous column. Otherwise, the distance will typically be set 264 to a value incremented from value stored in a previous element of the matrix. The current distance element may be set 264 to one plus the minimum of the distances stored in (previous row, previous column); (previous row, current column); and (current row, previous column).

If there are more columns in the current row to be processed 265, then go 258 to the next column corresponding to the next character of the recognized text string. If not 265, then check if there are more rows to be processed 267. If so, go 256 to the next row corresponding to the next character. Finally when all rows have been processed, the value in the last row, last column may be returned 268 as the Levenshtein distance between the recognized text string and the corrected text string.

FIGS. 2D-G are a code listing for an example process for checking if an edit distance is below a threshold. The example process actually checks two edit distances. The first edit distance is a modified Levenshtein distance that allows deletion, insertion, and substitution edit operations in the transformations between the recognized text string and the corrected text string, but does not count deletion operations in the distance value, i.e. deletions are considered a free operation. In some implementations, other edit operations may be given different weights in an edit distance (e.g., a substitution operation counts as 2, an insertion operation counts as 1, and a deletion operation counts as zero). Elements of the distance matrix with values greater than the threshold need not be calculated and are considered as dead-ends because subsequent values derived from them can only be the same or higher. When all the values in the current row of the distance matrix are above the threshold, then the check process may terminate, possibly without calculating the final edit distance for the two text strings, and return an indication that the edit distance was not below the threshold. The example code listing sets the threshold for the first edit distance to a percentage (e.g., 50%) of the length of the corrected text string.

The second edit distance is a maximum number of consecutive character insertion operations used to derive the corrected text string from the recognized text string. The example code listing sets the threshold for the second edit distance to a fixed value (e.g., 15 characters).

FIG. 2D provides a high level class definition in the C++ programing language for a module 270 that will check whether these two edit distances are both below their respective thresholds.

The getDistance function 280 accepts a recognized text string and a corrected text string as inputs and returns an edit distance that may saturate at the threshold or just above the threshold. A full definition of the getDistance function 280 is provide in FIG. 2E.

The DeltaTable class 290 distance matrices used by the module to check whether the edit distances are below the threshold. Due to the structure of the distances matrices rows before the previous row may be discarded while the check computations are ongoing, thus saving memory usage. A full definition of the DeltaTable class 290 is provide in FIG. 2F.

The Delta class 295 defines the properties of objects that may be used to track the state of the module as it checks whether the edit distances are below their respective thresholds. A full definition of the Delta class 295 is provided in FIG. 2G.

For example, module 270 may be implemented by the text recognition corrections filter module 110 of the search server system 101. The module 270 may be implemented by the text recognition corrections filter 552 of the mobile device 300.

Figure 3:
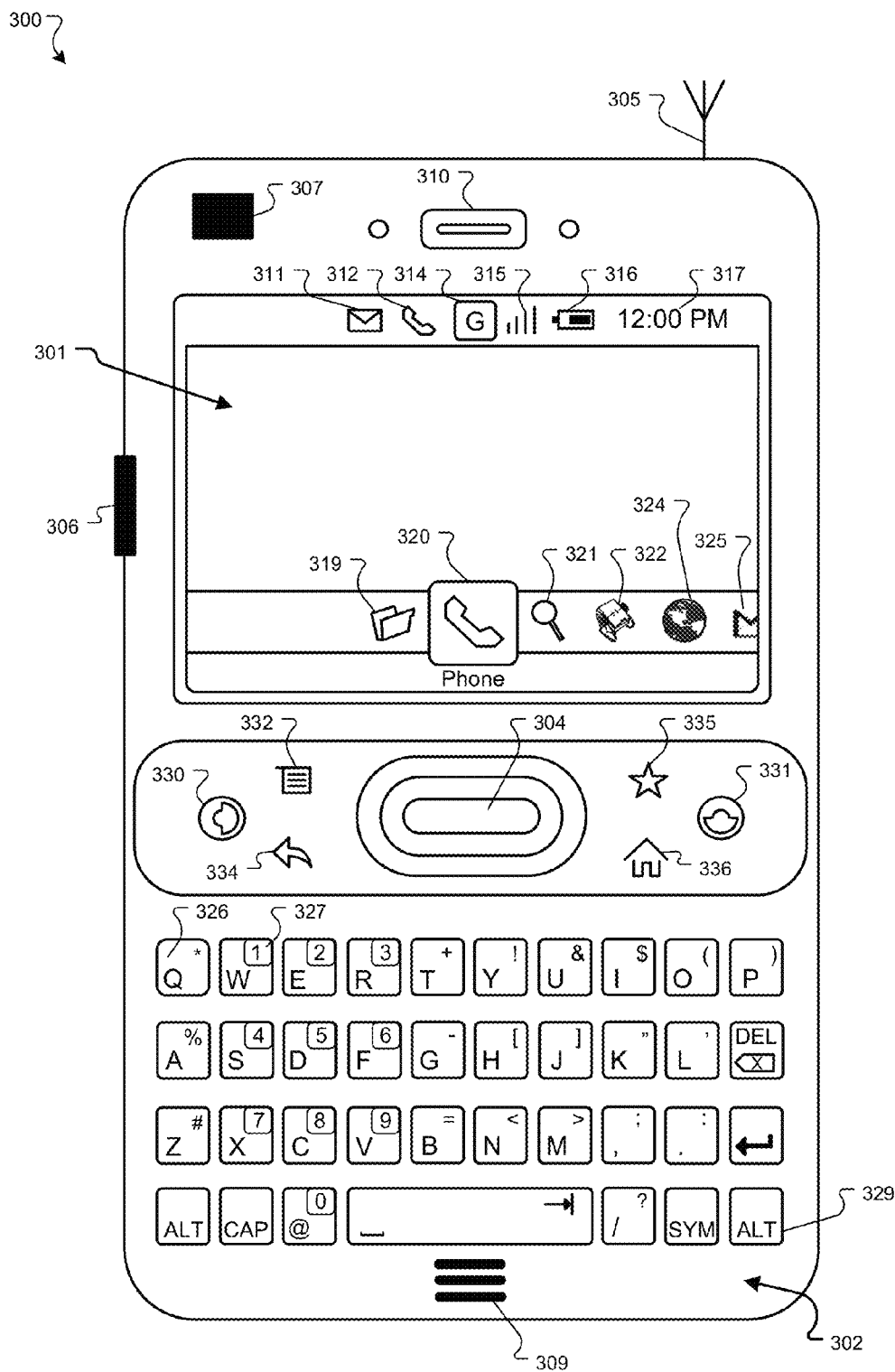
FIG. 3 is a schematic representation of an exemplary mobile device that implements embodiments of the text recognition corrections filter described herein.

Referring now to FIG. 3, the exterior appearance of an exemplary mobile device 300 that implements the text recognition correction filter 110 (shown in FIG. 1) is illustrated. Briefly, and among other things, the device 300 includes a processor configured to selectively collect user corrections to text recognition strings and pass them to a text recognition system for use as training data.

In more detail, the hardware environment of the device 300 includes a display 301 for displaying text, images, and video to a user; a keyboard 302 for entering text data and user commands into the device 300; a pointing device 304 for pointing, selecting, and adjusting objects displayed on the display 301; an antenna 305; a network connection 306; a camera 307; a microphone 309; and a speaker 310. Although the device 300 shows an external antenna 305, the device 300 can include an internal antenna, which is not visible to the user.

The display 301 can display video, graphics, images, and text that make up the user interface for the software applications used by the device 300, and the operating system programs used to operate the device 300. Among the possible elements that may be displayed on the display 301 are a new mail indicator 311 that alerts a user to the presence of a new message; an active call indicator 312 that indicates that a telephone call is being received, placed, or is occurring; a data standard indicator 314 that indicates the data standard currently being used by the device 300 to transmit and receive data; a signal strength indicator 315 that indicates a measurement of the strength of a signal received by via the antenna 305, such as by using signal strength bars; a battery life indicator 316 that indicates a measurement of the remaining battery life; or a clock 317 that outputs the current time.

The display 301 may also show application icons representing various applications available to the user, such as a web browser application icon 319, a phone application icon 320, a search application icon 321, a contacts application icon 322, a mapping application icon 324, an email application icon 325, or other application icons. In one example implementation, the display 301 is a quarter video graphics array (QVGA) thin film transistor (TFT) liquid crystal display (LCD), capable of 16-bit or better color.

A user uses the keyboard (or "keypad") 302 to enter commands and data to operate and control the operating system and applications that provide for interaction with text recognition systems. The keyboard 302 includes standard keyboard buttons or keys associated with alphanumeric characters, such as keys 326 and 327 that are associated with the alpha-numeric characters "Q" and "W" when selected alone, or are associated with the characters "*" and "1" when pressed in combination with key 329. A single key may also be associated with special characters or functions, including unlabeled functions, based upon the state of the operating system or applications invoked by the operating system. For example, when an application calls for the input of a numeric character, a selection of the key 327 alone may cause a "1" to be input.

In addition to keys traditionally associated with an alphanumeric keypad, the keyboard 302 also includes other special function keys, such as an establish call key 330 that causes a received call to be answered or a new call to be originated; a terminate call key 331 that causes the termination of an active call; a drop down menu key 332 that causes a menu to appear within the display 301; a backward navigation key 334 that causes a previously accessed network address to be accessed again; a favorites key 335 that causes an active web page to be placed in a bookmarks folder of favorite sites, or causes a bookmarks folder to appear; a home page key 336 that causes an application invoked on the device 300 to navigate to a predetermined network address; or other keys that provide for multiple-way navigation, application selection, and power and volume control.

The user uses the pointing device 304 to select and adjust graphics and text objects displayed on the display 301 as part of the interaction with and control of the device 300 and the applications invoked on the device 300. The pointing device 304 is any appropriate type of pointing device, and may be a joystick, a trackball, a touch-pad, a camera, a voice input device, a touch screen device implemented in combination with the display 301, or any other input device.

The antenna 305, which can be an external antenna or an internal antenna, is a directional or omni-directional antenna used for the transmission and reception of radiofrequency (RF) signals that implement point-to-point radio communication, wireless local area network (LAN) communication, or location determination. The antenna 305 may facilitate point-to-point radio communication using the Specialized Mobile Radio (SMR), cellular, or Personal Communication Service (PCS) frequency bands, and may implement the transmission of data using any number or data standards. For example, the antenna 305 may allow data to be transmitted between the device 300 and a base station using technologies such as Wireless Broadband (WiBro), Worldwide Interoperability for Microwave ACCess (WiMAX), 3GPP Long Term Evolution (LTE), Ultra Mobile Broadband (UMB), High Performance Radio Metropolitan Network (HIPERMAN), iBurst or High Capacity Spatial Division Multiple Access (HC-SDMA), High Speed OFDM Packet Access (HSOPA), High-Speed Packet Access (HSPA), HSPA Evolution, HSPA+, High Speed Upload Packet Access (HSUPA), High Speed Downlink Packet Access (HSDPA), Generic Access Network (GAN), Time Division-Synchronous Code Division Multiple Access (TD-SCDMA), Evolution-Data Optimized (or Evolution-Data Only)(EVDO), Time Division-Code Division Multiple Access (TD-CDMA), Freedom Of Mobile Multimedia Access (FOMA), Universal Mobile Telecommunications System (UMTS), Wideband Code Division Multiple Access (W-CDMA), Enhanced Data rates for GSM Evolution (EDGE), Enhanced GPRS (EGPRS), Code Division Multiple Access-2000 (CDMA2000), Wideband Integrated Dispatch Enhanced Network (WiDEN), High-Speed Circuit-Switched Data (HSCSD), General Packet Radio Service (GPRS), Personal Handy-Phone System (PHS), Circuit Switched Data (CSD), Personal Digital Cellular (PDC), CDMAone, Digital Advanced Mobile Phone System (D-AMPS), Integrated Digital Enhanced Network (IDEN), Global System for Mobile communications (GSM), DataTAC, Mobitex, Cellular Digital Packet Data (CDPD), Hicap, Advanced Mobile Phone System (AMPS), Nordic Mobile Phone (NMP), Auto-radiopuhelin (ARP), Autotel or Public Automated Land Mobile (PALM), Mobiltelefonisystem D (MTD), Offentlig Landmobil Telefoni (OLT), Advanced Mobile Telephone System (AMTS), Improved Mobile Telephone Service (IMTS), Mobile Telephone System (MTS), Push-To-Talk (PTT), or other technologies. Communication via W-CDMA, HSUPA, GSM, GPRS, and EDGE networks may occur, for example, using a QUALCOMM MSM7200A chipset with a QUALCOMM RTR6285™ transceiver and PM7540™ power management circuit.

The wireless or wired computer network connection 306 may be a modem connection, a local-area network (LAN) connection including the Ethernet, or a broadband wide-area network (WAN) connection such as a digital subscriber line (DSL), cable high-speed internet connection, dial-up connection, T-1 line, T-3 line, fiber optic connection, or satellite connection. The network connection 306 may connect to a LAN network, a corporate or government WAN network, the Internet, a telephone network, or other network. The network connection 306 uses a wired or wireless connector. Example wireless connectors include, for example, an INFRARED DATA ASSOCIATION (IrDA) wireless connector, a Wi-Fi wireless connector, an optical wireless connector, an INSTITUTE OF ELECTRICAL AND ELECTRONICS ENGINEERS (IEEE) Standard 802.11 wireless connector, a BLUETOOTH wireless connector (such as a BLUETOOTH version 1.2 or 3.0 connector), a near field communications (NFC) connector, an orthogonal frequency division multiplexing (OFDM) ultra wide band (UWB) wireless connector, a time-modulated ultra wide band (TM-UWB) wireless connector, or other wireless connector. Example wired connectors include, for example, an IEEE-1394 FIREWIRE connector, a Universal Serial Bus (USB) connector (including a mini-B USB interface connector), a serial port connector, a parallel port connector, or other wired connector. In another implementation, the functions of the network connection 306 and the antenna 305 are integrated into a single component.

The camera 307 allows the device 300 to capture digital images, and may be a scanner, a digital still camera, a digital video camera, or other digital input device. In one example implementation, the camera 307 is a 3 mega-pixel (MP) camera that utilizes a complementary metal-oxide semiconductor (CMOS).

The microphone 309 allows the device 300 to capture sound, and may be an omni-directional microphone, a unidirectional microphone, a bi-directional microphone, a shotgun microphone, or other type of apparatus that converts sound to an electrical signal. The microphone 309 may be used to capture sound generated by a user, for example when the user is speaking to another user during a telephone call via the device 300. Conversely, the speaker 310 allows the device to convert an electrical signal into sound, such as a voice from another user generated by a telephone application program, or a ring tone generated from a ring tone application program. Furthermore, although the device 300 is illustrated in FIG. 3 as a handheld device, in further implementations the device 300 may be a laptop, a workstation, a midrange computer, a mainframe, an embedded system, telephone, desktop PC, a tablet computer, a PDA, or other type of computing device.

Figure 4:
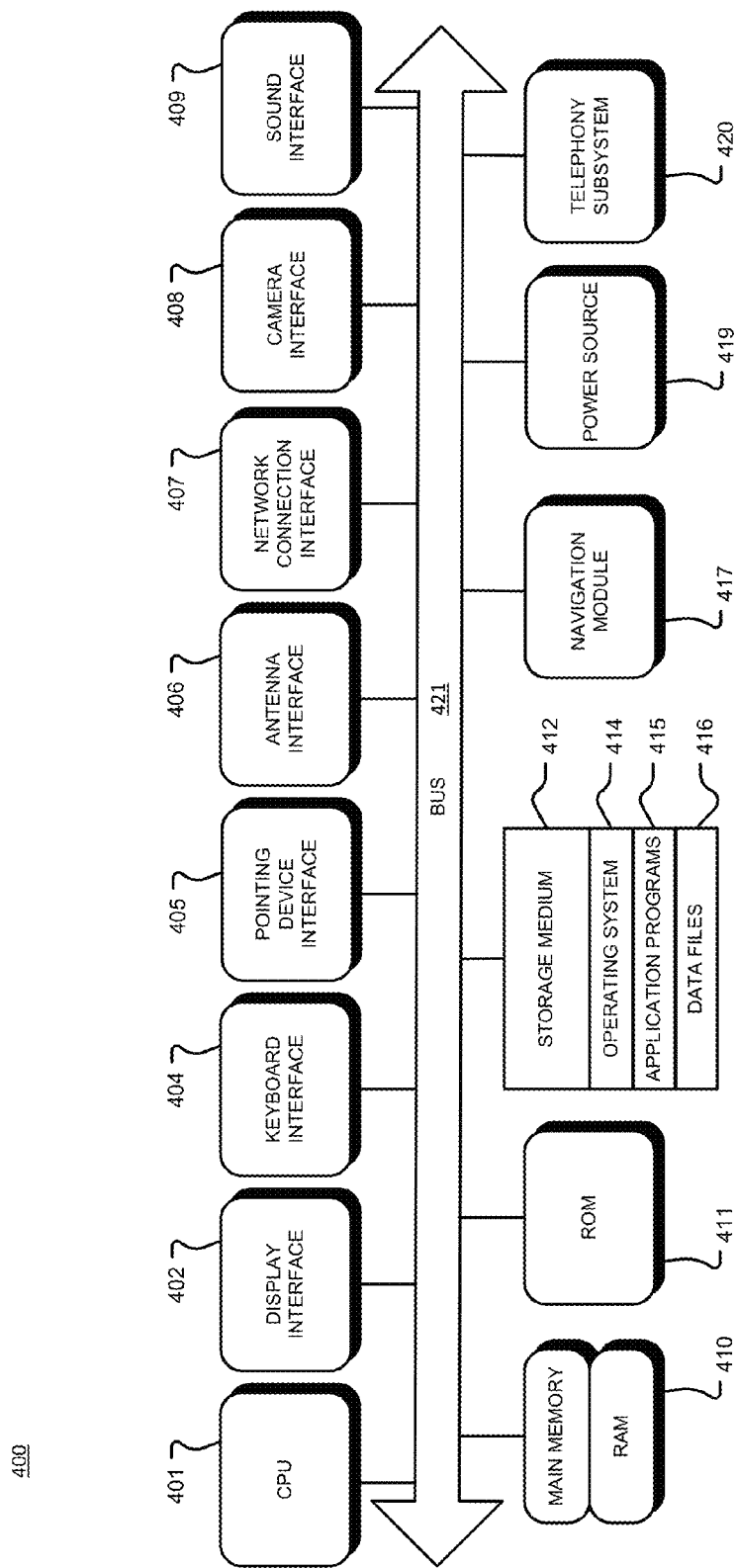
FIG. 4 is a block diagram illustrating the internal architecture of the device of FIG. 3.

FIG. 4 is a block diagram illustrating an internal architecture 400 of the device 300. The architecture includes a central processing unit (CPU) 401 where the computer instructions that comprise an operating system or an application are processed; a display interface 402 that provides a communication interface and processing functions for rendering video, graphics, images, and texts on the display 301, provides a set of built-in controls (such as buttons, text and lists), and supports diverse screen sizes; a keyboard interface 404 that provides a communication interface to the keyboard 302; a pointing device interface 405 that provides a communication interface to the pointing device 304; an antenna interface 406 that provides a communication interface to the antenna 305; a network connection interface 407 that provides a communication interface to a network over the computer network connection 306; a camera interface 408 that provides a communication interface and processing functions for capturing digital images from the camera 307; a sound interface 409 that provides a communication interface for converting sound into electrical signals using the microphone 309 and for converting electrical signals into sound using the speaker 310; a random access memory (RAM) 410 where computer instructions and data are stored in a volatile memory device for processing by the CPU 401; a read-only memory (ROM) 411 where invariant low-level systems code or data for basic system functions such as basic input and output (I/O), startup, or reception of keystrokes from the keyboard 302 are stored in a non-volatile memory device; a storage medium 412 or other suitable type of memory (e.g. such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives), where the files that comprise an operating system 414, application programs 415 (including, for example, a web browser application, a widget or gadget engine, and or other applications, as necessary) and data files 416 are stored; a navigation module 417 that provides a real-world or relative position or geographic location of the device 300; a power source 419 that provides an appropriate alternating current (AC) or direct current (DC) to power components; and a telephony subsystem 420 that allows the device 300 to transmit and receive sound over a telephone network. The constituent devices and the CPU 401 communicate with each other over a bus 421.

The CPU 401 can be one of a number of computer processors. In one arrangement, the computer CPU 401 is more than one processing unit. The RAM 410 interfaces with the computer bus 421 so as to provide quick RAM storage to the CPU 401 during the execution of software programs such as the operating system application programs, and device drivers. More specifically, the CPU 401 loads computer-executable process steps from the storage medium 412 or other media into a field of the RAM 410 in order to execute software programs. Data is stored in the RAM 410, where the data is accessed by the computer CPU 401 during execution. In one example configuration, the device 300 includes at least 128 MB of RAM, and 256 MB of flash memory.

The storage medium 412 itself may include a number of physical drive units, such as a redundant array of independent disks (RAID), a floppy disk drive, a flash memory, a USB flash drive, an external hard disk drive, thumb drive, pen drive, key drive, a High-Density Digital Versatile Disc (HD-DVD) optical disc drive, an internal hard disk drive, a Blu-Ray optical disc drive, or a Holographic Digital Data Storage (HDDS) optical disc drive, an external mini-dual in-line memory module (DIMM) synchronous dynamic random access memory (SDRAM), or an external micro-DIMM SDRAM. Such computer readable storage media allow the device 300 to access computer-executable process steps, application programs and the like, stored on removable and non-removable memory media, to off-load data from the device 300, or to upload data onto the device 300.

A computer program product is tangibly embodied in storage medium 412, a machine-readable storage medium. The computer program product includes instructions that, when read by a machine, operate to cause a data processing apparatus to store image data in the mobile device. In some embodiments, the computer program product includes instructions that cause a data processing apparatus to collect and filtering text recognition system corrections from users of a text recognition system.

The operating system 414 may be a LINUX-based operating system such as a mobile device platform; APPLE MAC OS X; MICROSOFT WINDOWS NT/WINDOWS 2000/WINDOWS XP/WINDOWS MOBILE; a variety of UNIX-flavored operating systems; or a proprietary operating system for computers or embedded systems. The application development platform or framework for the operating system 414 may be: BINARY RUNTIME ENVIRONMENT FOR WIRELESS (BREW); JAVA Platform, Micro Edition (JAVA ME) or JAVA 2 Platform, Micro Edition (J2ME) using the SUN MICROSYSTEMS JAVASCRIPT programming language; PYTHONTM, FLASH LITE, or MICROSOFT .NET Compact, or another appropriate environment.

The device stores computer-executable code for the operating system 414, and the application programs 415 such as an email, instant messaging, a video service application, a mapping application word processing, spreadsheet, presentation, gaming, mapping, web browsing, JAVASCRIPT engine, or other applications. For example, one implementation may allow a user to access the GMAIL email application, an instant messaging application, a video service application, a mapping application, or an imaging editing and presentation application. The application programs 415 may also include a widget or gadget engine, such as a TAFRITM widget engine, a MICROSOFT gadget engine such as the WINDOWS SIDEBAR gadget engine or the KAPSULES™ gadget engine, a YAHOO! widget engine such as the KONFABULTOR™ widget engine, the APPLE DASHBOARD widget engine, a gadget engine, the KLIPFOLIO widget engine, an OPERA™ widget engine, the WIDSETS™ widget engine, a proprietary widget or gadget engine, or other widget or gadget engine the provides host system software for a physically-inspired applet on a desktop.

Although it is possible to provide for filtering of text recognition corrections using the above-described implementation, it is also possible to implement the functions according to the present disclosure as a dynamic link library (DLL), or as a plug-in to other application programs such as an Internet web-browser such as the FOXFIRE web browser, the APPLE SAFARI web browser or the MICROSOFT INTERNET EXPLORER web browser.

The navigation module 417 may determine an absolute or relative position of the device, such as by using the Global Positioning System (GPS) signals, the GLObal NAvigation Satellite System (GLONASS), the Galileo positioning system, the Beidou Satellite Navigation and Positioning System, an inertial navigation system, a dead reckoning system, or by accessing address, internet protocol (IP) address, or location information in a database. The navigation module 417 may also be used to measure angular displacement, orientation, or velocity of the device 300, such as by using one or more accelerometers.

Figure 5:
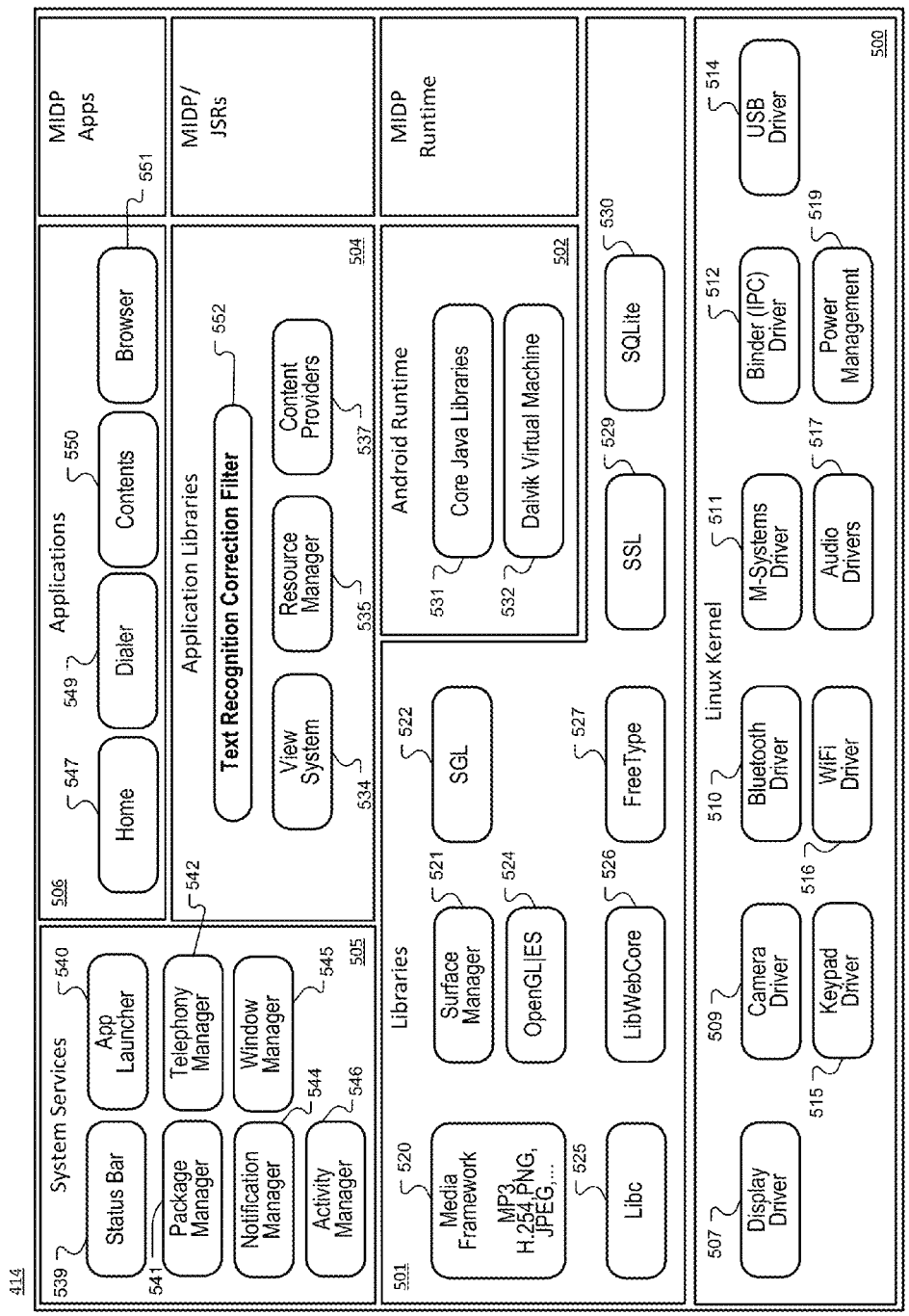
FIG. 5 is a block diagram illustrating exemplary components of the operating system used by the device of FIG. 3.

FIG. 5 is a block diagram illustrating exemplary components of the operating system 414 used by the device 300, in the case where the operating system 414 is a mobile device platform. The operating system 414 invokes multiple processes, while ensuring that the associated phone application is responsive, and that wayward applications do not cause a fault (or "crash") of the operating system. Using task switching, the operating system 414 allows for the switching of applications while on a telephone call, without losing the state of each associated application. The operating system 414 may use an application framework to encourage reuse of components, and provide a scalable user experience by combining pointing device and keyboard inputs and by allowing for pivoting. Thus, the operating system can provide a rich graphics system and media experience, while using an advanced, standards-based web browser.

The operating system 414 can generally be organized into six components: a kernel 500, libraries 501, an operating system runtime 502, application libraries 504, system services 505, and applications 506. The kernel 500 includes a display driver 507 that allows software such as the operating system 414 and the application programs 415 to interact with the display 301 via the display interface 402, a camera driver 509 that allows the software to interact with the camera 307; a BLUETOOTH driver 510; a M-Systems driver 511; a binder (IPC) driver 512, a USB driver 514 a keypad driver 515 that allows the software to interact with the keyboard 302 via the keyboard interface 404; a WiFi driver 516; audio drivers 517 that allow the software to interact with the microphone 309 and the speaker 310 via the sound interface 409; and a power management component 519 that allows the software to interact with and manage the power source 519.

The BLUETOOTH driver, which in one implementation is based on the BlueZ BLUETOOTH stack for LINUX-based operating systems, provides profile support for headsets and hands-free devices, dial-up networking, personal area networking (PAN), or audio streaming (such as by Advance Audio Distribution Profile (A2DP) or Audio/Video Remote Control Profile (AVRCP). The BLUETOOTH driver provides JAVA bindings for scanning, pairing and unpairing, and service queries.

The libraries 501 include a media framework 520 that supports standard video, audio and still-frame formats (such as Moving Picture Experts Group (MPEG)-4, H.264, MPEG-1 Audio Layer-3 (MP3), Advanced Audio Coding (AAC), Adaptive Multi-Rate (AMR), Joint Photographic Experts Group (JPEG), and others) using an efficient JAVA Application Programming Interface (API) layer; a surface manager 521; a simple graphics library (SGL) 522 for two-dimensional application drawing; an Open Graphics Library for Embedded Systems (OpenGL ES) 524 for gaming and three-dimensional rendering; a C standard library (LIBC) 525; a LIBWEBCORE library 526; a FreeType library 527; an SSL 529; and an SQLite library 530.

The operating system runtime 502 includes core JAVA libraries 531, and a Dalvik virtual machine 532. The Dalvik virtual machine 532 is a custom, virtual machine that runs a customized file format (.DEX).

The operating system 414 can also include Mobile Information Device Profile (MIDP) components such as the MIDP JAVA Specification Requests (JSRs) components, MIDP runtime, and MIDP applications as shown in FIG. 5. The MIDP components can support MIDP applications running on the device 300.

With regard to graphics rendering, a system-wide composer manages surfaces and a frame buffer and handles window transitions, using the OpenGL ES 524 and two-dimensional hardware accelerators for its compositions.

The Dalvik virtual machine 532 may be used with an embedded environment, since it uses runtime memory very efficiently, implements a CPU-optimized bytecode interpreter, and supports multiple virtual machine processes per device. The custom file format (.DEX) is designed for runtime efficiency, using a shared constant pool to reduce memory, read-only structures to improve cross-process sharing, concise, and fixed-width instructions to reduce parse time, thereby allowing installed applications to be translated into the custom file formal at build-time. The associated bytecodes are designed for quick interpretation, since register-based instead of stack-based instructions reduce memory and dispatch overhead, since using fixed width instructions simplifies parsing, and since the 16-bit code units minimize reads.

The application libraries 504 include a view system 534, a resource manager 535, content providers 537, and a text recognition corrections filter 552. The system services 505 includes a status bar 539; an application launcher 540; a package manager 541 that maintains information for all installed applications; a telephony manager 542 that provides an application level JAVA interface to the telephony subsystem 420; a notification manager 544 that allows all applications access to the status bar and on-screen notifications; a window manager 545 that allows multiple applications with multiple windows to share the display 301; and an activity manager 546 that runs each application in a separate process, manages an application life cycle, and maintains a cross-application history.

The applications 506 include a home application 547, a dialer application 549, a contacts application 550, and a browser application 551.

The telephony manager 542 provides event notifications (such as phone state, network state, Subscriber Identity Module (SIM) status, or voicemail status), allows access to state information (such as network information, SIM information, or voicemail presence), initiates calls, and queries and controls the call state. The browser application 551 renders web pages in a full, desktop-like manager, including navigation functions. Furthermore, the browser application 551 allows single column, small screen rendering, and provides for the embedding of HTML views into other applications.

Figure 6:
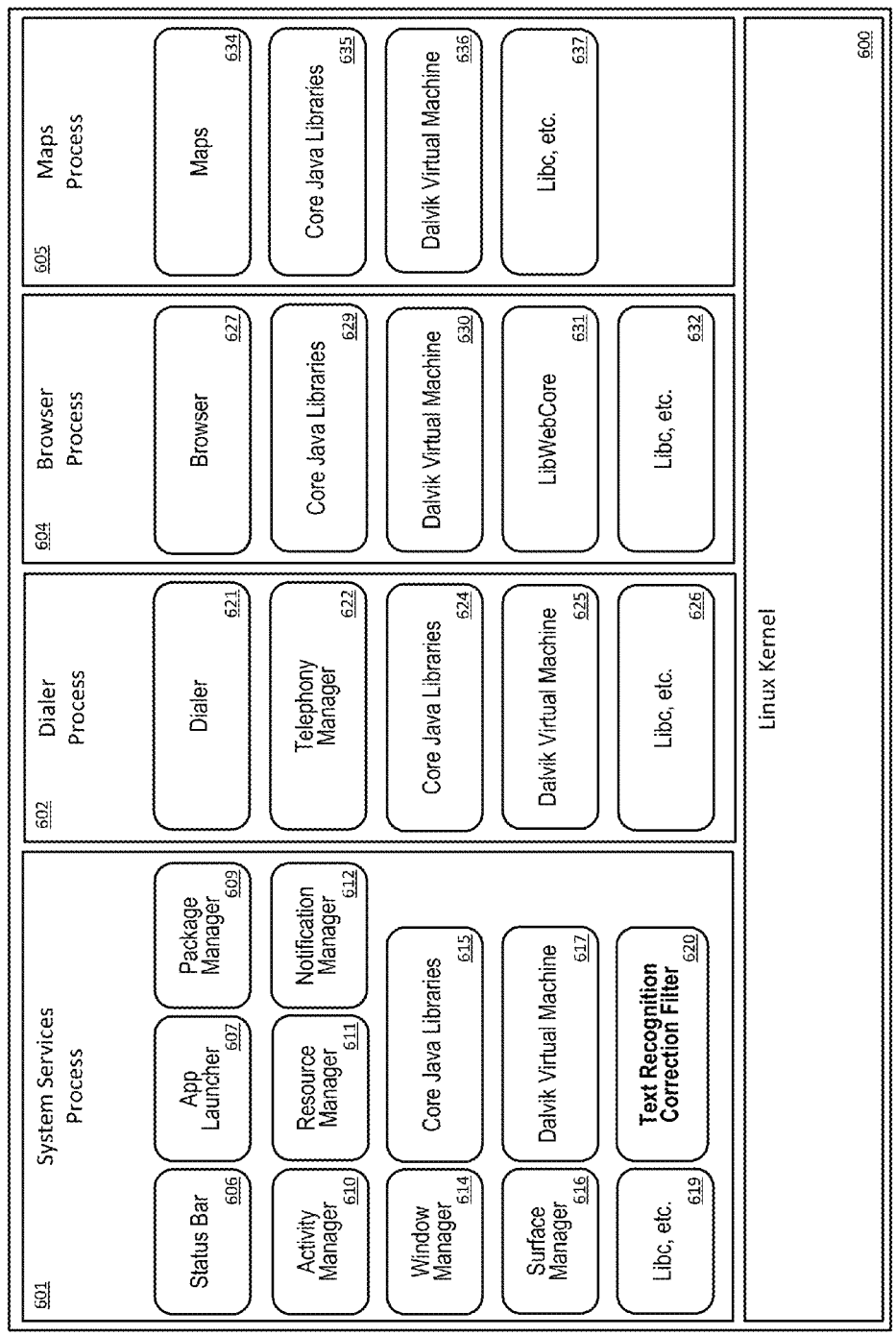
FIG. 6 is a block diagram illustrating exemplary processes implemented by the operating system kernel of FIG. 5.

FIG. 6 is a block diagram illustrating exemplary processes implemented by the operating system kernel 600. Generally, applications and system services run in separate processes, where the activity manager 546 runs each application in a separate process and manages the application life cycle. The applications run in their own processes, although many activities or services can also run in the same process. Processes are started and stopped as needed to run an application's components, and processes may be terminated to reclaim resources. Each application is assigned its own process, whose name is the application's package name, and individual parts of an application can be assigned another process name.

Some processes can be persistent. For example, processes associated with core system components such as the surface manager 616, the window manager 614, or the activity manager 610 can be continuously executed while the device 300 is powered. Additionally, some application-specific process can also be persistent. For example, processes associated with the dialer application 621, may also be persistent.

The processes implemented by the operating system kernel 600 may generally be categorized as system services processes 601, dialer processes 602, browser processes 604, and maps processes 605. The system services processes 601 include status bar processes 606 associated with the status bar 539; application launcher processes 607 associated with the application launcher 540; package manager processes 609 associated with the package manager 541; activity manager processes 610 associated with the activity manager 546; resource manager processes 611 associated with a resource manager 611 that provides access to graphics, localized strings, and XML layout descriptions; notification manger processes 612 associated with the notification manager 544; window manager processes 614 associated with the window manager 545; core JAVA libraries processes 615 associated with the core JAVA libraries 531; surface manager processes 616 associated with the surface manager 521; Dalvik virtual machine processes 617 associated with the Dalvik virtual machine 532, LIBC processes 619 associated with the LIBC library 525; and text recognition correction filter processes 620 associated with the text recognition correction filter application library 552.

The dialer processes 602 include dialer application processes 621 associated with the dialer application 549; telephony manager processes 622 associated with the telephony manager 542; core JAVA libraries processes 624 associated with the core JAVA libraries 531; Dalvik virtual machine processes 625 associated with the Dalvik Virtual machine 532; and LIBC processes 626 associated with the LIBC library 525. The browser processes 604 include browser application processes 627 associated with the browser application 551; core JAVA libraries processes 629 associated with the core JAVA libraries 531; Dalvik virtual machine processes 630 associated with the Dalvik virtual machine 532; LIBWEBCORE processes 631 associated with the LIBWEBCORE library 526; and LIBC processes 632 associated with the LIBC library 525.

The maps processes 605 include maps application processes 634, core JAVA libraries processes 635, Dalvik virtual machine processes 636, and LIBC processes 637. Notably, some processes, such as the Dalvik virtual machine processes, may exist within one or more of the systems services processes 601, the dialer processes 602, the browser processes 604, and the maps processes 605.

FIG. 7 shows an example of a generic computer device 700 and a generic mobile computer device 750, which may be used with the techniques described here. Computing device 700 is intended to represent various forms of digital computers, such as laptops, desktops, workstations, personal digital assistants, servers, blade servers, mainframes, and other appropriate computers. Computing device 750 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 700 includes a processor 702, memory 704, a storage device 706, a high-speed interface 708 connecting to memory 704 and high-speed expansion ports 710, and a low speed interface 712 connecting to low speed bus 714 and storage device 706. Each of the components 702, 704, 706, 708, 710, and 712, are interconnected using various busses, and may be mounted on a common motherboard or in other manners as appropriate. The processor 702 can process instructions for execution within the computing device 700, including instructions stored in the memory 704 or on the storage device 706 to display graphical information for a GUI on an external input/output device, such as display 716 coupled to high speed interface 708. In other implementations, multiple processors and/or multiple buses may be used, as appropriate, along with multiple memories and types of memory. Also, multiple computing devices 700 may be connected, with each device providing portions of the necessary operations (e.g., as a server bank, a group of blade servers, or a multi-processor system).

The memory 704 stores information within the computing device 700. In one implementation, the memory 704 is a volatile memory unit or units. In another implementation, the memory 704 is a non-volatile memory unit or units. The memory 704 may also be another form of computer-readable medium, such as a magnetic or optical disk.

The storage device 706 is capable of providing mass storage for the computing device 700. In one implementation, the storage device 706 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 704, the storage device 706, memory on processor 702, or a propagated signal.

The high speed controller 708 manages bandwidth-intensive operations for the computing device 700, while the low speed controller 712 manages lower bandwidth-intensive operations. Such allocation of functions is exemplary only. In one implementation, the high-speed controller 708 is coupled to memory 704, display 716 (e.g., through a graphics processor or accelerator), and to high-speed expansion ports 710, which may accept various expansion cards (not shown). In the implementation, low-speed controller 712 is coupled to storage device 706 and low-speed expansion port 714. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 720, or multiple times in a group of such servers. It may also be implemented as part of a rack server system 724. In addition, it may be implemented in a personal computer such as a laptop computer 722. Alternatively, components from computing device 700 may be combined with other components in a mobile device (not shown), such as device 750. Each of such devices may contain one or more of computing device 700, 750, and an entire system may be made up of multiple computing devices 700, 750 communicating with each other.

Computing device 750 includes a processor 752, memory 764, an input/output device such as a display 754, a communication interface 766, and a transceiver 768, among other components. The device 750 may also be provided with a storage device, such as a microdrive or other device, to provide additional storage. Each of the components 750, 752, 764, 754, 766, and 768, are interconnected using various buses, and several of the components may be mounted on a common motherboard or in other manners as appropriate.

The processor 752 can execute instructions within the computing device 750, including instructions stored in the memory 764. The processor may be implemented as a chipset of chips that include separate and multiple analog and digital processors. The processor may provide, for example, for coordination of the other components of the device 750, such as control of user interfaces, applications run by device 750, and wireless communication by device 750.

Processor 752 may communicate with a user through control interface 758 and display interface 756 coupled to a display 754. The display 754 may be, for example, a TFT LCD (Thin-Film-Transistor Liquid Crystal Display) or an OLED (Organic Light Emitting Diode) display, or other appropriate display technology. The display interface 756 may comprise appropriate circuitry for driving the display 754 to present graphical and other information to a user. The control interface 758 may receive commands from a user and convert them for submission to the processor 752. In addition, an external interface 762 may be provide in communication with processor 752, so as to enable near area communication of device 750 with other devices. External interface 762 may provide, for example, for wired communication in some implementations, or for wireless communication in other implementations, and multiple interfaces may also be used.

The memory 764 stores information within the computing device 750. The memory 764 can be implemented as one or more of a computer-readable medium or media, a volatile memory unit or units, or a non-volatile memory unit or units. Expansion memory 774 may also be provided and connected to device 750 through expansion interface 772, which may include, for example, a SIMM (Single In Line Memory Module) card interface. Such expansion memory 774 may provide extra storage space for device 750, or may also store applications or other information for device 750. Specifically, expansion memory 774 may include instructions to carry out or supplement the processes described above, and may include secure information also. Thus, for example, expansion memory 774 may be provide as a security module for device 750, and may be programmed with instructions that permit secure use of device 750. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 764, expansion memory 774, memory on processor 752, or a propagated signal that may be received, for example, over transceiver 768 or external interface 762.

Device 750 may communicate wirelessly through communication interface 766, which may include digital signal processing circuitry where necessary. Communication interface 766 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 768. In addition, short-range communication may occur, such as using a Bluetooth, WiFi, or other such transceiver (not shown). In addition, GPS (Global Positioning System) receiver module 770 may provide additional navigation- and location-related wireless data to device 750, which may be used as appropriate by applications running on device 750.

Device 750 may also communicate audibly using audio codec 760, which may receive spoken information from a user and convert it to usable digital information. Audio codec 760 may likewise generate audible sound for a user, such as through a speaker, e.g., in a handset of device 750. Such sound may include sound from voice telephone calls, may include recorded sound (e.g., voice messages, music files, etc.) and may also include sound generated by applications operating on device 750.

The computing device 750 may be implemented in a number of different forms, as shown in the figure. For example, it may be implemented as a cellular telephone 780. It may also be implemented as part of a smartphone 782, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention. For example, text recognition system may be implemented on a mobile device (e.g., mobile device 300) along with a text recognition corrections filter. The local text recognition system may be adapted to speech or handwriting patterns of a particular user, in part, by training with corrections selected using the text recognition corrections filter.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A computer-implemented method performed by a data processing apparatus, the method comprising:
    recording an input signal comprising data that corresponds to one or more words;
    transmitting the input signal to a text recognition system that generates a recognized text string based on the input signal;
    receiving the recognized text string from the text recognition system;
    displaying the recognized text string to a user;
    receiving data that represents one or more user edits to the recognized text string;
    determining a corrected text string based on the recognized text string and the user edits;
    determining an edit distance between the corrected text string and the recognized text string;
    comparing the edit distance to a threshold, wherein the threshold depends on a length of the corrected text string; and
    if the edit distance is below the threshold, transmitting the corrected text string to the text recognition system.

2. The method of claim 1, wherein the edit distance represents the minimum number of single character insertion, deletion, or substitution operations required to transform the recognized text string into the corrected text string.

3. The method of claim 1, wherein the edit distance is a maximum number of consecutive characters inserted.

4. The method of claim 1, wherein the text recognition system is executed by a remotely located server.

5. The method of claim 1, wherein the text recognition system is executed by a user device.

6. The method of claim 1, wherein transmitting the input signal to a text recognition system comprises:
    transmitting a signal encoding the input signal through a network.

7. A system, comprising:
    a data processing apparatus; and
    a memory coupled to the data processing apparatus having instructions stored thereon which, when executed by the data processing apparatus cause the data processing apparatus to perform operations comprising:
        receiving an input signal comprising data that corresponds to one or more words;
        passing the input signal to a text recognition system that generates a recognized text string based on the input signal;
        receiving the recognized text string from the text recognition system;
        presenting the recognized text string to a user;
        receiving a corrected text string based on input from the user;

checking if an edit distance between the corrected text string and the recognized text string is below a threshold, wherein the threshold depends on a length of the corrected text string; and if the edit distance is below the threshold, passing the corrected text string to the text recognition system.

8. The system of claim 7, wherein the edit distance represents the minimum number of single character insertion, deletion, or substitution operations required to transform the recognized text string into the corrected text string.

9. The system of claim 7, wherein the text recognition system is executed by a remotely located server.

10. The system of claim 7, wherein the text recognition system is executed by a user device.

11. The system of claim 7, wherein passing the input signal to a text recognition system comprises:

transmitting a signal encoding the input signal through a network.

12. A system, comprising:

an interface configured to receive an input signal comprising data that corresponds to one or more words;

an interface configured to pass the input signal to a text recognition system that generates a recognized text string based on the input signal;

an interface configured to receive the recognized text string from the text recognition system;

an interface configured to present the recognized text string to a user;

an interface configured to receiving a corrected text string based on input from the user;

means for checking if an edit distance between the corrected text string and the recognized text string is below a threshold, wherein the threshold depends on a length of the corrected text string; and an interface configured to, if the edit distance is below the threshold, pass the corrected text string to the text recognition system.

13. The system of claim 12, wherein the edit distance represents the minimum number of single character insertion, deletion, or substitution operations required to transform the recognized text string into the corrected text string.

14. The system of claim 12, wherein the edit distance is a maximum number of consecutive characters inserted.

15. The system of claim 12, wherein passing the input signal to a text recognition system comprises:

transmitting a signal encoding the input signal through a network.

16. The system of claim 12, wherein receiving a corrected text string based on input from the user comprises:

receiving data that represents one or more user edits to the recognized text string; and determining a corrected text string based on the recognized text string and the edits.

17. The system of claim 12, wherein presenting the recognized text string to a user comprises:

transmitting the recognized text to a user device for display to the user.

18. A mobile device, comprising:

a microphone configured to receive an input signal comprising data that corresponds to one or more words;

a wireless network interface configured to transmit the input signal to a text recognition system that generates a recognized text string based on the input signal;

a wireless network interface configured to receive the recognized text string from the text recognition system;

a display configured to present the recognized text string to a user;

a user interface configured to receive one or more edits to the recognized text string from the user;

a module configured to determine a corrected text string based on the recognized text string and the user edits;

means for checking if an edit distance between the corrected text string and the recognized text string is below a threshold, wherein the threshold depends on a length of the corrected text string; and a wireless network interface configured to, if the edit distance is below the threshold, pass the corrected text string to the text recognition system.

19. The mobile device of claim 18, wherein the edit distance represents the minimum number of single character insertion, deletion, or substitution operations required to transform the recognized text string into the corrected text string.

20. The mobile device of claim 18, wherein the edit distance is a maximum number of consecutive characters inserted.

21. The mobile device of claim 18, wherein the text recognition system is executed by a remotely located server.

22. The mobile device of claim 18, wherein checking if an edit distance between the corrected text string and the recognized text string is below threshold comprises:

determining the edit distance; and comparing the edit distance to the threshold.

23. A computer-implemented method performed by a data processing apparatus, the method comprising:

recording an input signal comprising data that corresponds to one or more words;

transmitting the input signal to a text recognition system that generates a recognized text string based on the input signal;

receiving the recognized text string from the text recognition system;

displaying the recognized text string to a user;

receiving data that represents one or more user edits to the recognized text string;

determining a corrected text string based on the recognized text string and the user edits;

determining an edit distance between the corrected text string and the recognized text string, wherein the edit distance is a minimum number of write operations, from a set of allowed operations, needed to produce the corrected text string from the recognized text string, wherein write operations include character insertion and character substitution, and wherein character deletion is allowed but not counted in the edit distance;

comparing the edit distance to a threshold; and if the edit distance is below the threshold, transmitting the corrected text string to the text recognition system.

24. A system, comprising:

a data processing apparatus; and a memory coupled to the data processing apparatus having instructions stored thereon which, when executed by the data processing apparatus cause the data processing apparatus to perform operations comprising:

receiving an input signal comprising data that corresponds to one or more words;

passing the input signal to a text recognition system that generates a recognized text string based on the input signal;

receiving the recognized text string from the text recognition system;

presenting the recognized text string to a user;

receiving a corrected text string based on input from the user;

checking if an edit distance between the corrected text string and the recognized text string is below a threshold, wherein the edit distance is a minimum number of write operations, from a set of allowed operations, needed to produce the corrected text string from the recognized text string, wherein write operations include character insertion and character substitution, and wherein character deletion is allowed but not counted in the edit distance; and if the edit distance is below the threshold, passing the corrected text string to the text recognition system.

25. A system, comprising:
a data processing apparatus; and
a memory coupled to the data processing apparatus having instructions stored thereon which, when executed by the data processing apparatus cause the data processing apparatus to perform operations comprising:
receiving an input signal comprising data that corresponds to one or more words;
passing the input signal to a text recognition system that generates a recognized text string based on the input signal;
receiving the recognized text string from the text recognition system;
presenting the recognized text string to a user;
receiving a corrected text string based on input from the user;
checking if an edit distance between the corrected text string and the recognized text string is below a threshold, wherein checking if an edit distance between the corrected text string and the recognized text string is below threshold comprises computing intermediate edit distance values until the threshold is exceeded or the edit distance is determined; and
if the edit distance is below the threshold, passing the corrected text string to the text recognition system.

26. A system, comprising:
an interface configured to receive an input signal comprising data that corresponds to one or more words;
an interface configured to pass the input signal to a text recognition system that generates a recognized text string based on the input signal;
an interface configured to receive the recognized text string from the text recognition system;
an interface configured to present the recognized text string to a user;
an interface configured to receiving a corrected text string based on input from the user;
means for checking if an edit distance between the corrected text string and the recognized text string is below a threshold, wherein the edit distance is a minimum number of write operations, from a set of allowed operations, needed to produce the corrected text string from the recognized text string, wherein write operations include character insertion and character substitution, and wherein character deletion is allowed but not counted in the edit distance; and
an interface configured to, if the edit distance is below the threshold, pass the corrected text string to the text recognition system.

27. A system, comprising:
an interface configured to receive an input signal comprising data that corresponds to one or more words;
an interface configured to pass the input signal to a text recognition system that generates a recognized text string based on the input signal;
an interface configured to receive the recognized text string from the text recognition system;
an interface configured to present the recognized text string to a user;
an interface configured to receiving a corrected text string based on input from the user;
means for checking if an edit distance between the corrected text string and the recognized text string is below a threshold, wherein checking if an edit distance between the corrected text string and the recognized text string is below threshold comprises computing intermediate edit distance values until the threshold is exceeded or the edit distance is determined; and
an interface configured to, if the edit distance is below the threshold, pass the corrected text string to the text recognition system.

28. A mobile device, comprising:
a microphone configured to receive an input signal comprising data that corresponds to one or more words;
a wireless network interface configured to transmit the input signal to a text recognition system that generates a recognized text string based on the input signal;
a wireless network interface configured to receive the recognized text string from the text recognition system;
a display configured to present the recognized text string to a user;
a user interface configured to receive one or more edits to the recognized text string from the user;
a module configured to determine a corrected text string based on the recognized text string and the user edits;
means for checking if an edit distance between the corrected text string and the recognized text string is below a threshold, wherein the edit distance is a minimum number of write operations, from a set of allowed operations, needed to produce the corrected text string from the recognized text string, wherein write operations include character insertion and character substitution, and wherein character deletion is allowed but not counted in the edit distance; and
a wireless network interface configured to, if the edit distance is below the threshold, pass the corrected text string to the text recognition system.

29. A mobile device, comprising:
a microphone configured to receive an input signal comprising data that corresponds to one or more words;
a wireless network interface configured to transmit the input signal to a text recognition system that generates a recognized text string based on the input signal;
a wireless network interface configured to receive the recognized text string from the text recognition system;
a display configured to present the recognized text string to a user;
a user interface configured to receive one or more edits to the recognized text string from the user;
a module configured to determine a corrected text string based on the recognized text string and the user edits;
means for checking if an edit distance between the corrected text string and the recognized text string is below a threshold, wherein checking if an edit distance between the corrected text string and the recognized text string is below threshold comprises computing intermediate edit distance values until the threshold is exceeded or the edit distance is determined; and
a wireless network interface configured to, if the edit distance is below the threshold, pass the corrected text string to the text recognition system.

* * * * *